United States Patent
Kim et al.

(10) Patent No.: US 7,522,492 B2
(45) Date of Patent: Apr. 21, 2009

(54) CIRCUIT AND METHOD FOR DETECTING ADDRESS IN PRE-GROOVE (ADIP) SIGNAL IN WOBBLE DETECTION SYSTEM OF OPTICAL DISC APPARATUS

(75) Inventors: Soo-yong Kim, Suwon-si (KR); Young-hoon Lee, Seoul (KR); Seok-min Yun, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 64 days.

(21) Appl. No.: 11/836,223

(22) Filed: Aug. 9, 2007

(65) Prior Publication Data
US 2008/0025177 A1    Jan. 31, 2008

Related U.S. Application Data

(62) Division of application No. 10/832,937, filed on Apr. 27, 2004, now Pat. No. 7,272,087.

(30) Foreign Application Priority Data

Jun. 26, 2003  (KR) ............... 10-2003-0042134
Jun. 26, 2003  (KR) ............... 10-2003-0042140

(51) Int. Cl.
*G11B 7/00* (2006.01)
(52) U.S. Cl. ............. 369/47.21; 369/47.22; 369/59.23; 369/59.17
(58) Field of Classification Search ............... None
See application file for complete search history.

(56) References Cited

U.S. PATENT DOCUMENTS

| 6,310,851 | B1 | 10/2001 | Tobita et al. |
| 6,385,257 | B1 | 5/2002 | Tobita et al. |
| 6,925,049 | B2* | 8/2005 | Ogawa ............ 369/47.27 |
| 7,072,265 | B2* | 7/2006 | Hanks ............ 369/53.34 |
| 2003/0202440 | A1* | 10/2003 | Furumiya et al. ........ 369/59.25 |

FOREIGN PATENT DOCUMENTS

| JP | 11-45519 | 2/1999 |
| JP | 2002-208231 | 7/2002 |
| JP | 2003-085749 | 3/2003 |

* cited by examiner

*Primary Examiner*—Jorge L. Ortiz-Criado
(74) *Attorney, Agent, or Firm*—Mills & Onello, LLP (57) ABSTRACT

An ADIP (address in pre-groove) signal detection circuit is capable of correctly and quickly detecting discontinuous points in a wobble signal, and has a simple configuration in a wobble detection system of an optical disc device such as a DVD+R/RW, and an ADIP signal detection method thereof. The ADIP signal detection circuit performing the ADIP signal detection method includes one or two window comparators, two edge detection circuits each consisting of an exclusive OR circuit and an AND circuit, and two discontinuous point determination circuits each consisting of a flip-flop and a counter. Therefore, the ADIP signal detection circuit has a simple configuration so that it can be easily implemented. Also, since the ADIP signal detection circuit has a fast operation speed, the ADIP signal detection circuit detects discontinuous points correctly and quickly.

10 Claims, 7 Drawing Sheets

CIRCUIT AND METHOD FOR DETECTING ADDRESS IN PRE-GROOVE (ADIP) SIGNAL IN WOBBLE DETECTION SYSTEM OF OPTICAL DISC APPARATUS

RELATED APPLICATIONS

This application is a divisional of U.S. application Ser. No. 10/832,937, filed on Apr. 27, 2004, which relies for priority upon Korean Patent Application No. 2003-42134, filed on Jun. 26, 2003, and Korean Patent Application No. 2003-42140, filed Jun. 26, 2003, the contents of which are herein incorporated by reference in their entirety.

FIELD OF THE INVENTION

The present invention relates to a wobble detection system used in an optical disc apparatus such as a DVD+R/RW disk, and more particularly, to a circuit for detecting an ADIP (address in pre-groove) signal in a wobble detection system and a method for detecting an ADIP signal.

DESCRIPTION OF THE RELATED ART

To record data on a DVD+R/RW disk, it is critical that the disc address information, that is, ADIP (address in pre-groove) of the DVD+R/RW disk, is correctly demodulated. In a case where the disc address information is not correctly demodulated, recording quality is reduced and it may be impossible to read data recorded on the DVD+R/RW disk.

Figure 1:
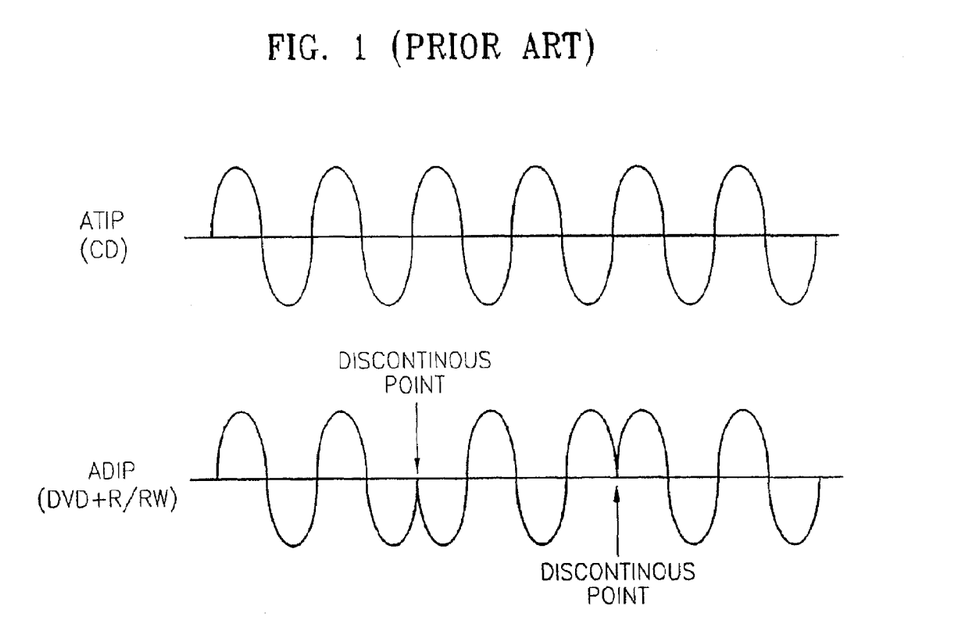
FIG. 1 shows waveforms of an ATIP (absolute time in pre-groove) signal of CD and an ADIP (address in pre-groove) signal of a DVD+R/RW disc.

The ADIP signal of a DVD+R/RW disc has discontinuous points, unlike an ATIP (Absolute Time In Pre-groove) signal of a CD, as shown in FIG. 1. Since these discontinuous points represent data of an ADIP unit according to ADIP Modulation Rules, it is very important to detect the discontinuous points.

Figure 2:
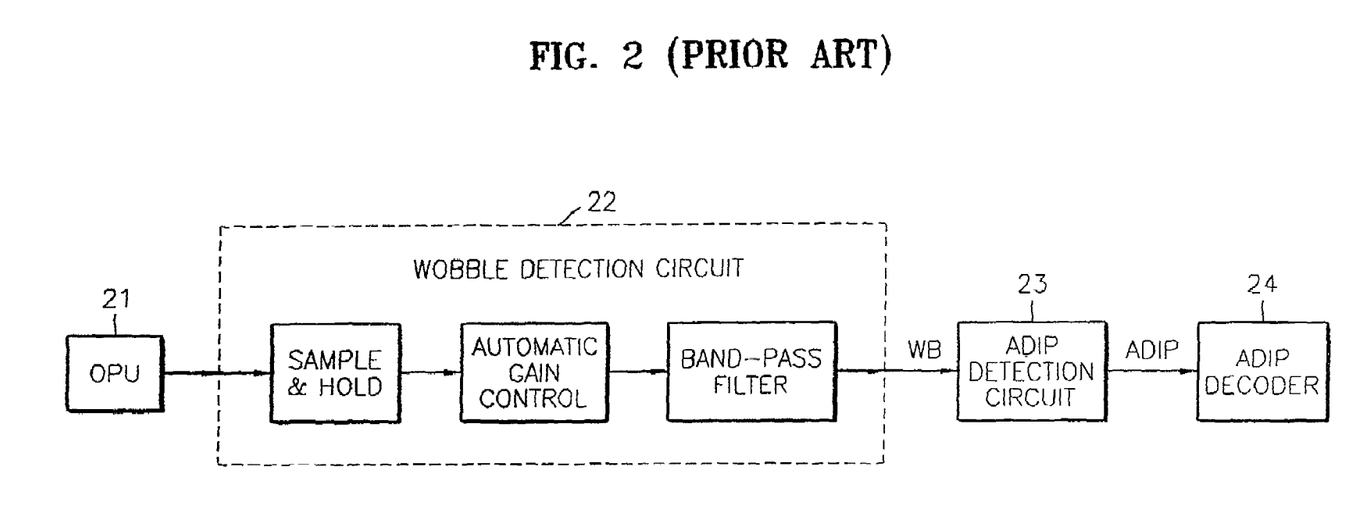
FIG. 2 is a block diagram of a wobble detection system used in a conventional DVD+R/RW disc writer.

FIG. 2 is a block diagram of a wobble detection system used in a conventional DVD+R/RW disc system. Referring to FIG. 2, a wobble detection circuit 22 receives a signal from an OPU (Optical Pick-up Unit) 21, detects a wobble signal WB from the received signal, and transfers the WB signal to an ADIP signal detection circuit 23. The ADIP signal detection circuit 23 receives the wobble signal WB, detects an ADIP signal ADIP, and transfers the ADIP signal ADIP to an ADIP decoder 24. The ADIP decoder 24 decodes the ADIP signal ADIP.

However, as described above, since the ADIP signal has discontinuous points, it is necessary that the ADIP signal detection circuit 23 detects the discontinuous points correctly and quickly. Also, the ADIP signal detection circuit 23 should have a simple configuration to be easily implemented.

SUMMARY OF THE INVENTION

The present invention provides an ADIP (address in pre-groove) signal detection circuit, capable of correctly and quickly detecting discontinuous points and has a simple configuration, to be used in a wobble detection system of an optical disc device such as a DVD+R/RW disc system.

The present invention also provides an ADIP signal detection method, which is capable of correctly and quickly detecting discontinuous points, to be used in a wobble detection system of an optical disc device such as a DVD+R/RW disc system.

According to an aspect of the present invention, there is provided an ADIP signal detection circuit comprising a delayer, a first window comparator, a second window comparator, a first edge detection circuit, a second edge detection circuit, a first discontinuous point determination circuit, a second discontinuous point determination circuit, an ADIP signal generator, and a reference level control circuit. The delayer delays a wobble signal by a predetermined time period. The first window comparator compares the wobble signal with a positive reference level to generate a first comparison signal and compares the wobble signal with a negative reference level to generate a second comparison signal. The second window comparator compares the positive reference level with an output signal of the delayer to generate a third comparison signal and compares the negative reference level with an output signal of the delayer to generate a fourth comparison signal. The first edge detection circuit receives the first comparison signal and the third comparison signal and detects edges of the first comparison signal. The second edge detection circuit receives the second comparison signal and the fourth comparison signal and detects edges of the second comparison signal. The first discontinuous point determination circuit generates a signal corresponding to a positive discontinuous point of the wobble signal when two successive edges among the edges detected by the first edge detection circuit exist in a predetermined time interval. The second discontinuous point determination circuit generates a signal corresponding to a negative discontinuous point of the wobble signal when two successive edges among the edges detected by the second edge detection circuit exist in the predetermined time interval.

The ADIP signal generator receives the signal corresponding to the positive discontinuous point of the wobble signal and the signal corresponding to the negative discontinuous point of the wobble signal, and generates an ADIP signal. A reference level control circuit controls the positive reference level and the negative reference level. The edges are positive edges or negative edges.

In one embodiment, the first edge detection circuit comprises an exclusive OR circuit, which performs an exclusive OR operation of the first comparison signal and the third comparison circuit; and an AND circuit, which performs an AND operation of an output signal of the exclusive OR circuit and the first or the third comparison signal. The first discontinuous point determination circuit comprises a counter, which counts the edges detected by the first edge detection circuit in response to a clock signal and generates the signal corresponding to the positive discontinuous point when the two successive edges exist in the predetermined time interval. The second edge detection circuit comprises an exclusive OR circuit, which performs an exclusive OR operation of the second comparison signal and the fourth comparison signal; and an AND circuit, which performs an AND operation of an output signal of the exclusive OR circuit and the second or the fourth comparison signal. The second discontinuous point determination circuit comprises a counter, which counts the edges detected by the second edge detection circuit in response to a clock signal and generates the signal corresponding to the negative discontinuous point when the two successive edges exist in the predetermined time interval.

According to another aspect of the present invention, there is provided an ADIP signal detection circuit comprising a window comparator, a first edge detection circuit, a second edge detection circuit, a first discontinuous point determination circuit, a second discontinuous point determination circuit, an ADIP signal generator, and a reference level control circuit. The window comparator compares a wobble signal with a positive reference level to generate a first comparison signal and compares the wobble signal with a negative reference level to generate a second comparison signal. The first edge detection circuit receives the first comparison signal and detects edges of the first comparison signal. The second edge detection circuit receives the second comparison signal and detects edges of the second comparison signal. The first discontinuous point determination circuit generates a signal corresponding to a positive discontinuous point of the wobble signal when two successive edges among the edges detected by the first edge detection circuit exist in a predetermined time interval. The second discontinuous point determination circuit generates a signal corresponding to a negative discontinuous point of the wobble signal when two successive edges among the edges detected by the second edge detection circuit exist in the predetermined time interval.

The ADIP signal generator receives the signal corresponding to the positive discontinuous point of the wobble signal and the signal corresponding to the negative discontinuous point of the wobble signal, and generates an ADIP signal. The edges are positive edges or negative edges.

In one embodiment, the first edge detection circuit comprises a delayer, which delays the first comparison signal by a predetermined time period; an exclusive OR circuit, which performs an exclusive OR operation of the first comparison signal and an output signal of the delayer; and an AND circuit, which performs an AND operation of an output signal of the exclusive OR circuit and the first comparison signal or an output signal of the delayer. The first discontinuous point determination circuit comprises a counter, which counts the edges detected by the first edge detection circuit in response to a clock signal and generates the signal corresponding to the positive discontinuous point when the two successive edges exist in the predetermined time interval. The second edge detection circuit comprises: a delayer, which delays the second comparison signal by a predetermined time period; an exclusive OR circuit, which performs an exclusive OR operation of the second comparison signal and an output signal of the delayer; and an AND circuit, which performs an AND operation of an output signal of the exclusive OR circuit and the second comparison signal or the output signal of the delayer. The second discontinuous point determination circuit comprises a counter, which counts the edges detected by the second edge detection circuit in response to a clock signal and generates the signal corresponding to the negative discontinuous point when the two successive edges exist in the predetermined time interval.

According to another aspect of the present invention, there is provided an ADIP signal detection circuit comprising a differentiator, a window comparator, an ADIP signal generator, and a reference level control circuit. The differentiator receives and differentiates a wobble signal. The window comparator compares an output signal of the differentiator with a positive reference level to generate a first comparison signal and compares the output signal of the differentiator with a negative reference level to generate a second comparison signal. The ADIP signal generator generates an ADIP signal that represents a positive discontinuous point of the wobble signal in response to an edge of the first comparison signal and represents a negative discontinuous point of the wobble signal in response to an edge of the second comparison signal. The reference level control circuit controls the positive reference level and the negative reference level.

The ADIP signal becomes a first logic state at the edge of the first comparison signal and becomes a second logic state at the edge of the second comparison signal.

According to another aspect of the present invention, an ADIP signal detection method comprises: comparing a wobble signal with a positive reference level to generate a first comparison signal and comparing the wobble signal with a negative reference level to generate a second comparison signal. The wobble signal is delayed in a predetermined time period. The positive reference level and an output signal of the delayer are compared to each other to generate a third comparison signal, and the negative reference signal and the output signal of the delayer are compared to each other to generate a fourth comparison signal. Then, the first comparison signal and the third comparison signal are received and edges of the first comparison signal are detected. The second comparison signal and the fourth comparison signal are received and edges of the second comparison signal are detected. When two successive edges among the detected edges of the first comparison signal exist in a predetermined time interval, a signal corresponding to a positive discontinuous point of the wobble signal is generated. When two successive edges among the detected edges of the second comparison signal exist in the predetermined time interval, a signal corresponding to a negative discontinuous point of the wobble signal is generated.

Then, the signal corresponding to the positive discontinuous point of the wobble signal and the signal corresponding to the negative discontinuous point of the wobble signal are received and an ADIP signal is generated. The edges are positive edges or negative edges.

According to another aspect of the present invention, there is an ADIP signal detection method comprising, comparing a wobble signal with a positive reference level to generate a first comparison signal and comparing the wobble signal with a negative reference level to generate a second comparison signal. Then, the first comparison signal is received and edges of the first comparison signal are detected. The second comparison signal is received and edges of the second comparison signal are detected. Then, when two successive edges among the detected edges of the first comparison signal exist in a predetermined time interval, a signal corresponding to a positive discontinuous point of the wobble signal is generated. When two successive edges among the detected edges of the second comparison signal exist in the predetermined time interval, a signal corresponding to a negative discontinuous point of the wobble signal is generated.

The signal corresponding to the positive discontinuous point of the wobble signal and the signal corresponding to the negative discontinuous point of the wobble signal are received and an ADIP signal is generated. The edges are positive edges and negative edges.

According to another aspect of the present invention, there is provided an ADIP signal detection method comprising, receiving and differentiating a wobble signal. Then, the differentiated signal is compared with a positive reference level to generate a first comparison signal and the differentiated signal is compared with a negative reference level to generate a second comparison signal. Then, an ADIP signal which represents a positive discontinuous point of the wobble signal in response to an edge of the first comparison signal and which represents a negative discontinuous point of the wobble signal in response to an edge of the second comparison signal, is generated.

The ADIP signal is a first logic state at the edge of the first comparison signal and is a second logic state at the edge of the second comparison signal. The edge of the first comparison signal and the edge of the second comparison signal are rising edges or falling edges.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, preferred embodiments of the present invention will be described in detail with reference to the appended drawings. The same components included in the respective drawings are denoted by the same reference numbers.

Figure 3:
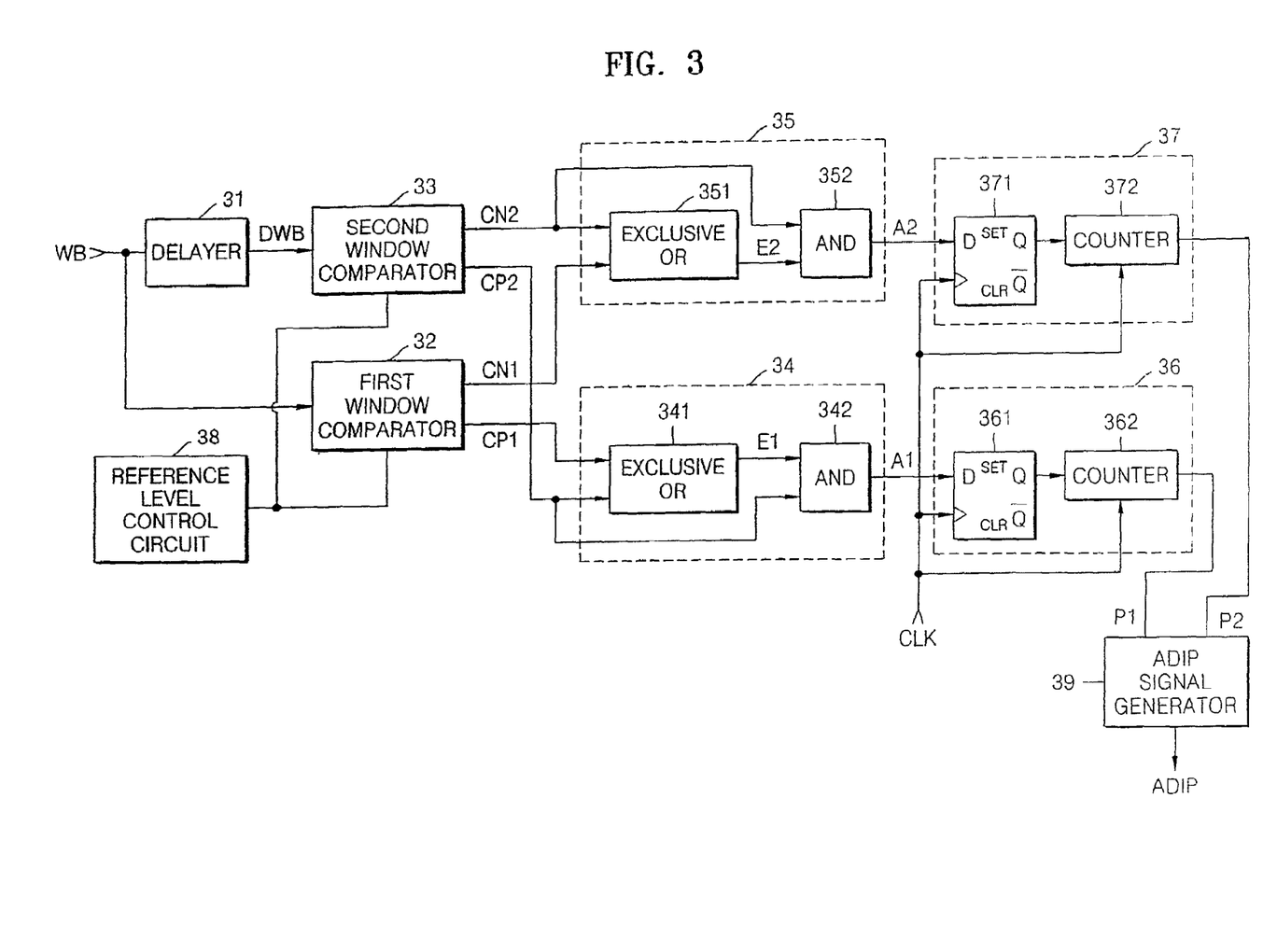
FIG. 3 is a block diagram of an ADIP signal detection circuit according to a first embodiment of the present invention.

FIG. 3 is a block diagram of an ADIP (address in pregroove) signal detection circuit according to a first embodiment of the present invention.

Referring to FIG. 3, the ADIP signal detection circuit according to the first embodiment of the present invention includes a delayer 31, a first window comparator 32, a second window comparator 33, a first edge detection circuit 34, a second edge detection circuit 35, a first discontinuous point determination circuit 36, a second discontinuous point determination circuit 37, a reference level control circuit 38, and an ADIP signal generator 39.

The delayer 31 delays a wobble signal WB received via a wobble detection circuit (not shown) by a predetermined time period. The delayer 31 can include, for example, a low-pass filter (LPF) or a digital phase delay device. Here, the delay time of the delayer 31 is related to the response speed of the signal. If the delay time is too long, the discontinuous point may not be detected correctly. Therefore, the delay time should be appropriately set.

The first window comparator 32 compares the wobble signal WB with a positive reference level REFP and generates a first comparison signal CP1. Also, the first window comparator 32 compares the wobble signal WB with a negative reference level REFN and generates a second comparison signal CN1. The second window comparator 33 compares the positive reference signal REFP with an output signal DWB of the delayer 31 and generates a third comparison signal CP2. Also, the second window comparison 33 compares the negative reference level REFN with the output signal DWB of the delayer 31 and generates a fourth comparison signal CN2.

The positive reference level REFP and the negative reference level REFN are controlled by the reference level control circuit 38. The positive reference level REFP and the negative reference level REFN are closely related to the detection speed of the ADIP signal ADIP and also is related to correct detection of signals. Accordingly, to achieve a fast detection speed and prevent detection errors from be generated, it is necessary to determine an optimal level.

The first edge detection circuit 34 and the first discontinuous point determination circuit 36 are provided to detect discontinuous points in positive data of the wobble signal WB. The second edge detection circuit 35 and the second discontinuous point determination circuit 37 are provided to detect discontinuous points in negative data of the wobble signal WB.

The first edge detection circuit 34 receives the first comparison signal CP1 and the third comparison signal CP2 and detects edges of the first comparison signal CP1. The second edge detection circuit 35 receives the second comparison signal CN1 and the four comparison signal CN2 and detects edges of the second comparison signal CN1. Here, the first edge detection circuit 34 and the second edge detection circuit 35 can be constructed to detect positive edges or to detect negative edges as necessary.

The first discontinuous point determination circuit 36 generates a signal P1 corresponding to a positive discontinuous point of the wobble signal WB when two successive edges among the edges detected by the first edge detection circuit 34 exist in a predetermined time interval. That is, when two successive edges exist in the predetermined time interval, it is determined that a discontinuous point exists in the positive data of the wobble signal WB.

The second discontinuous point determination circuit 37 generates a signal P2 corresponding to a negative discontinuous point of the wobble signal WB when two successive edges among the edges detected by the second edge detection circuit 35 exist in the predetermined time interval. That is, when two successive edges exist in the predetermined time interval, it is determined that a discontinuous point exists in the negative data of the wobble signal WB The ADIP signal generator 39 receives the signal P1 corresponding to the positive discontinuous point of the wobble signal and the signal P2 corresponding to the negative discontinuous point of the wobble signal, and, in response, generates an ADIP signal.

In more detail, the first edge detection circuit 34 includes an exclusive OR circuit 341 which performs an exclusive OR operation of the first comparison signal CP1 and the third comparison signal CP2, and an AND circuit 342 which performs an AND operation of an output signal E1 of the exclusive OR circuit 341 and the third comparison signal CP2.

Here, the first edge detection circuit 34 is constructed to detect negative edges. The first edge detection circuit 34 can alternatively be constructed to detect positive edges. In this case, instead of the third comparison signal CP2, the first comparison signal CP1 is input to the AND circuit 342.

The second edge detection circuit 35 includes an exclusive OR circuit 351 which performs an exclusive OR operation of the second comparison signal CN1 and the fourth comparison signal CN2; and an AND circuit 352 which performs an AND operation of an output signal E2 of the exclusive OR circuit 351 and the fourth comparison signal CN2.

Here, the second edge detection circuit 35 is constructed to detect negative edges. The second edge detection circuit 35 can be constructed to detect positive edges. In this case, instead of the fourth comparison signal CN2, the second comparison signal CN1 is input to the AND circuit 352.

The first discontinuous point determination circuit 36 includes a flip-flop 361 which receives an output signal A1 of the first edge detection circuit 34 in response to a clock signal CLK, and a counter 362 which counts output signals of the flip-flop 361 in response to the clock signal CLK. The counter 362 counts the edges detected by the first edge detection circuit 34 in response to the clock signal CLK, and generates a signal P1 corresponding to the positive discontinuous point when two successive edges exist in the predetermined time interval.

The second discontinuous point determination circuit 37 includes a flip-flop 371 which receives an output signal A2 of the second edge detection circuit 35 in response to a clock signal CLK, and a counter 372 which counts output signals of the flip-flop 371 in response to a clock signal CLK. The counter 372 counts the edges detected by the second edge detection circuit 35 in response to the clock signal CLK and generates a signal P2 corresponding to the negative discontinuous point when two successive edges exist in the predetermined time interval. The clock signal CLK is related to the speed of the desired DVD+R/RW disc system.

Figure 4:
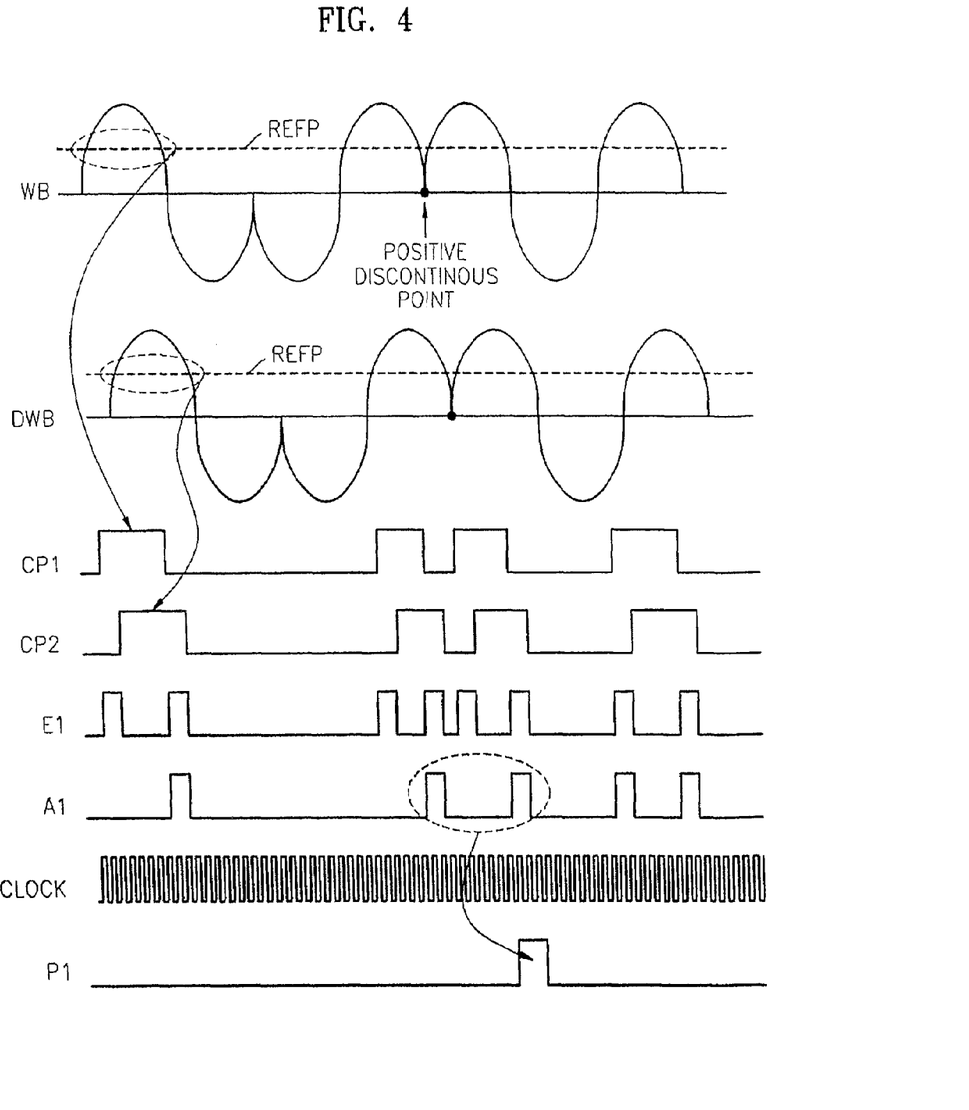
FIG. 4 shows waveforms of signals processed by the ADIP signal detection circuit of FIG. 3 when the ADIP signal detection circuit detects positive discontinuous points.
Figure 5:
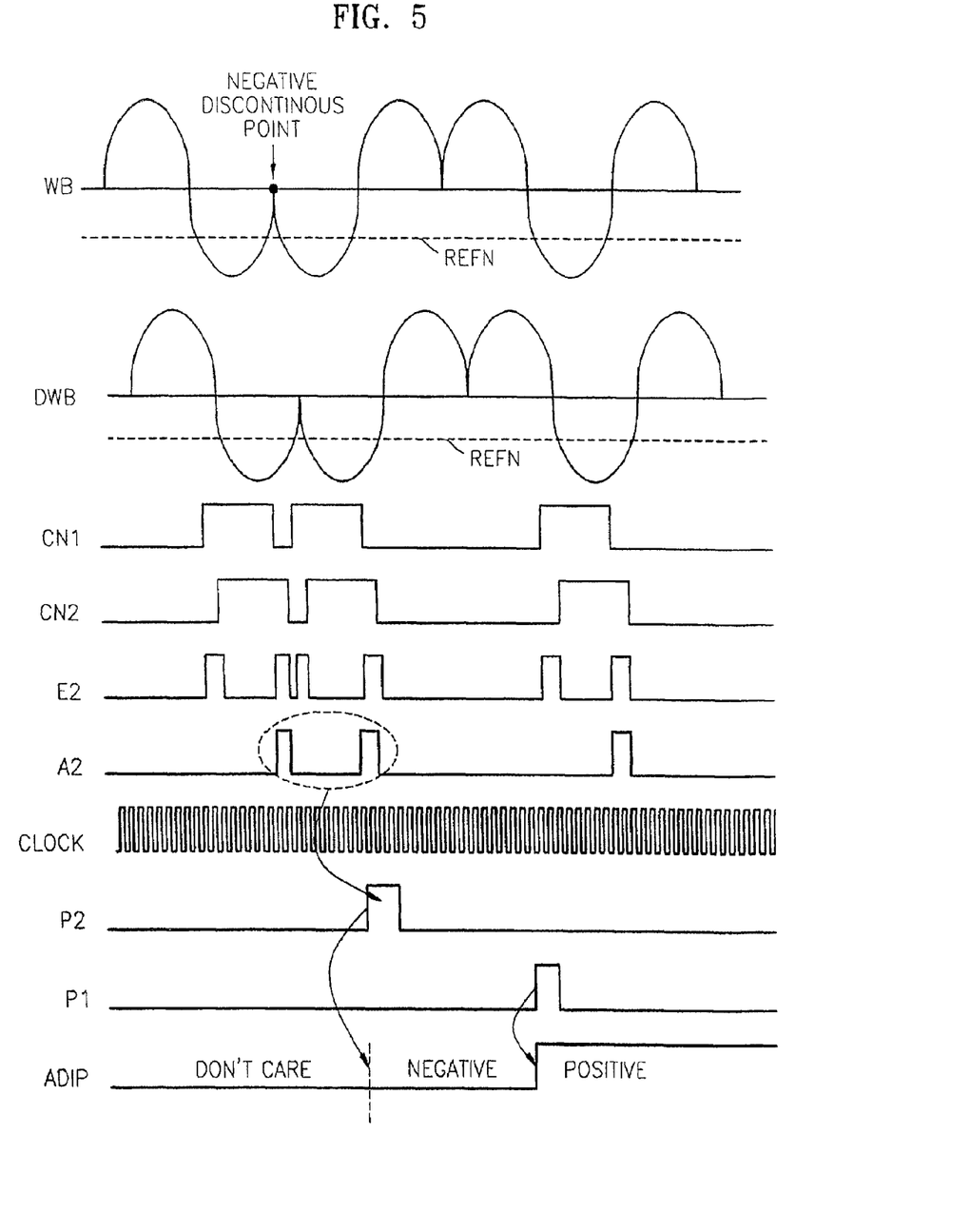
FIG. 5 shows waveforms of signals processed by the ADIP signal detection circuit of FIG. 3 when the ADIP signal detection circuit detects negative discontinuous points.

FIG. 4 shows waveforms of signals processed by the ADIP signal detection circuit of FIG. 3 when the ADIP signal detection circuit detects a positive discontinuous point. FIG. 5 shows waveforms of signals processed by the ADIP signal detection circuit of FIG. 3 when the ADIP signal detection circuit detects a negative discontinuous point.

Hereinafter, an ADIP signal detection method according to the present invention, which is performed by the ADIS signal detection circuit according to the first embodiment, will be described in detail with reference to FIGS. 4 and 5.

If a wobble signal WB is input to the wobble detection circuit (not shown), the wobble signal WB is delayed by a predetermined time period by the delayer 31 to generate a delayed wobble signal DWB. The wobble signal WB is compared with a positive reference level REFP by the first window comparator 32 to thereby generate a first comparison signal CP1. Also, the wobble signal WB is compared with a negative reference level REFN by the first window comparator 32 to thereby generate a second comparison signal CN1.

The delayed wobble signal DWB is compared with the positive reference level REFP by the second window comparator 33 to thereby generate a third comparison signal CP2. Also, the delayed wobble signal DWB is compared with the negative reference level REFN by the second window comparator 33 to thereby generate a fourth comparison signal CN2.

Next, the first comparison signal CP1 and the third comparison signal CP2 are subjected to an exclusive OR operation by the exclusive OR circuit 341 of the first edge detection circuit 34. An output signal E1 of the exclusive OR circuit 341 and the third comparison signal CP2 are subjected to an AND operation by the AND circuit 342. As a result, a signal A1, pulses of which correspond to the falling edges of the first comparison signal CP1, is generated.

The signal A1 is input to the counter 362 via the flip-flop 361 of the first discontinuous point determination circuit 36. When it is determined at the counter 362 that two successive pulses among the pulses of the signal A1 exist in a predetermined time interval, a signal P1 corresponding to a positive discontinuous point of the wobble signal WB is generated. That is, when two successive pulses exist in the predetermined time interval, it is determined that a discontinuous point exists in the positive data of the wobble signal WB.

Meanwhile, the second comparison signal CN1 and the fourth comparison signal CN2 are subjected to an exclusive OR operation by the exclusive OR circuit 351 of the second edge detection circuit 35. An output signal E2 of the exclusive OR circuit 351 and the fourth comparison signal CN2 are subjected to an AND operation by the AND circuit 352. As a result, a signal A2 with pulses representing the falling edges of the second comparison signal CN1 is generated.

The signal A2 is input to the counter 372 via the flip-flop 371 of the second discontinuous point determination circuit 37. When it is determined at the counter 372 that two successive pulses among the pluses of the signal A2 exist in the predetermined time interval, a signal P2 corresponding to a negative discontinuous point of the wobble signal WB is generated. That is, when two successive pulses exist in the predetermined time interval, it is determined that a discontinuous point exists in the negative data of the wobble signal WB.

The signal P1 corresponding to the positive discontinuous point of the wobble signal WB and the signal P2 corresponding to the negative discontinuous point of the wobble signal WB are input to the ADIP signal generator 39. A final signal ADIP output from the ADIP signal generator 39 is "low" at the rising edges of the signal P2 and is "high" at the rising edges of the signal P1. In other words, the final signal ADIP is "low" when a negative discontinuous point exists in the wobble signal WB and becomes "high" when a positive discontinuous point exists in the wobble signal WB.

Figure 6:
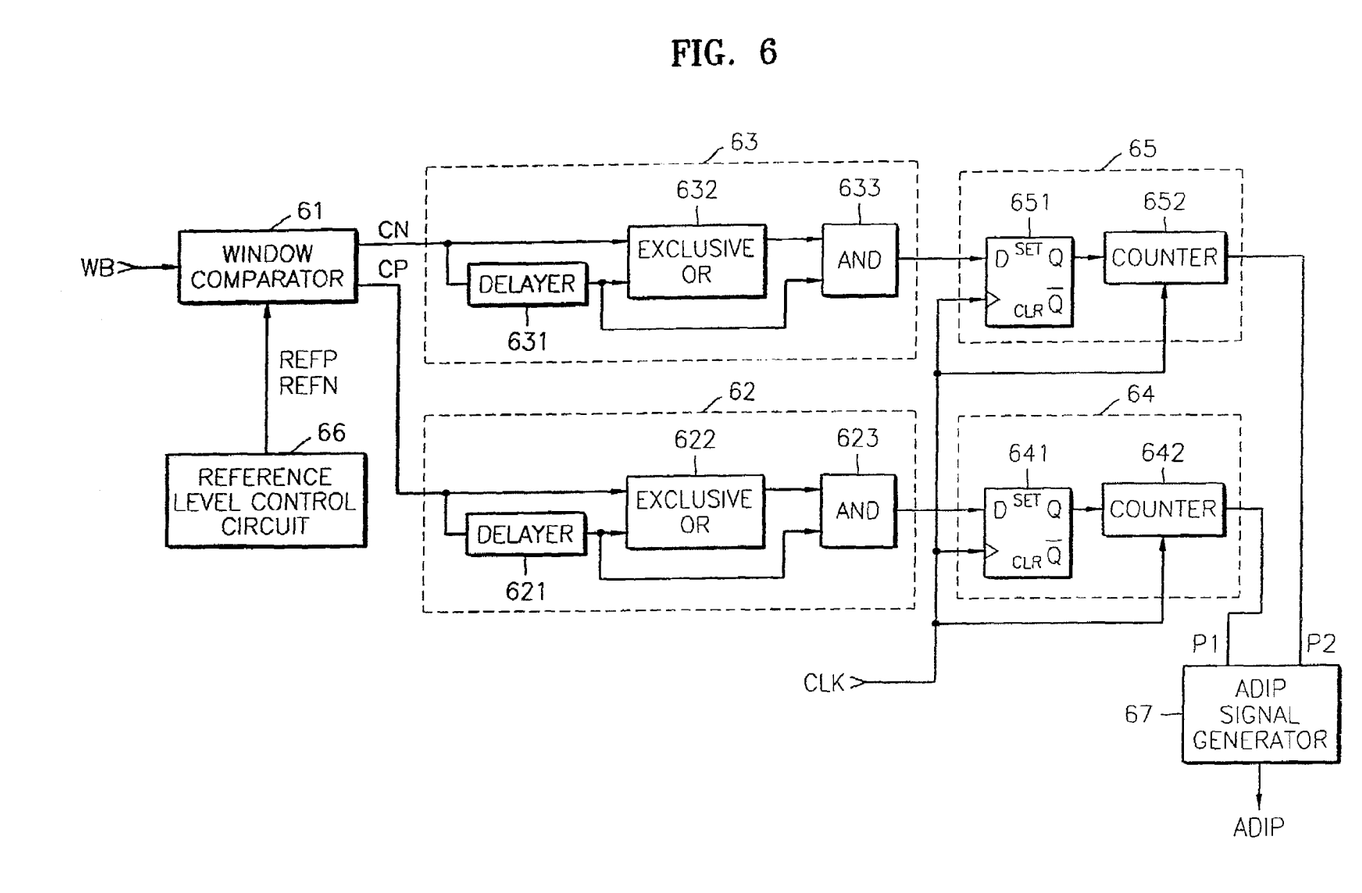
FIG. 6 is a block diagram of an ADIP signal detection circuit according to a second embodiment of the present invention.

FIG. 6 is a block diagram of an ADIP signal detection circuit according to a second embodiment of the present invention.

Referring to FIG. 6, the ADIP signal detection circuit according to a second embodiment of the present invention includes a window comparator 61, a first edge detection circuit 62, a second edge detection circuit 63, a first discontinuous point determination circuit 64, a second discontinuous point determination circuit 65, a reference level control circuit 66, and an ADIP signal generator 67.

The ADIP signal detection circuit according to the second embodiment performs the same operation as the ADIP signal detection circuit according to the first embodiment shown in FIG. 3, however, has a different configuration.

The window comparator 61 compares a wobble signal WB with a positive reference level REFP and generates a first comparison signal CP. Also, the window comparator 61 compares the wobble signal WB with a negative reference level REFN and generates a second comparison signal CN. The positive reference level REFP and the negative reference level REFN are controlled by the reference level control circuit 66.

The first edge detection circuit 62 and the first discontinuous point determination circuit 64 are provided to detect discontinuous points in positive data of the wobble signal WB. The second edge detection circuit 63 and the second discontinuous point determination circuit 65 are provided to detect discontinuous points in negative data of the wobble signal WB.

The first edge detection circuit 62 receives the first comparison circuit CP and detects the edges of the first comparison signal CP. The second edge detection circuit 63 receives the second comparison signal CN and detects the edges of the second comparison signal CN. The first edge detection circuit 62 and the second edge detection circuit 63 are constructed to detect positive edges or to detect negative edges as necessary.

Here, the first edge detection circuit 62 is constructed to detect negative edges and includes a delayer 621, an exclusive OR circuit 622, and an AND circuit 623. The delayer 621 delays the first comparison signal CP by a predetermined time period. The exclusive OR circuit 622 performs an exclusive OR operation of the first comparison signal CP and an output signal of the delayer 621. The AND circuit 622 performs an AND operation of an output signal of the exclusive OR circuit 622 and an output signal of the delayer 621.

In a case where the first edge detection circuit 62 is constructed to detect positive edges, instead of the output signal of the delayer 621, the first comparison signal CP is input to the AND circuit 623.

The second edge detection circuit 63 is constructed to detect negative edges and includes a delayer 631, an exclusive OR circuit 632, and an AND circuit 633. The delayer 631 delays the second comparison signal CN by a predetermined time period. The exclusive OR circuit 632 performs an exclusive OR operation of the second comparison signal CN and an output signal of the delayer 631. The AND circuit 633 performs an AND operation of an output signal of the exclusive OR circuit 632 and an output signal of the delayer 631.

In a case where the second edge detection circuit 63 is constructed to detect positive edges, instead of the output signal of the delayer 631, the second comparison signal CN is input to the AND circuit 633.

The first discontinuous point determination circuit 64 includes a flipflop 641 and a counter 642 like the first embodiment and performs the same operation as in the first embodiment. That is, the first discontinuous point determination circuit 64 generates a signal P1 corresponding to a positive discontinuous point of the wobble signal WB when two successive edges among the edges detected by the first edge detection circuit 62 exist in a predetermined time interval.

The second discontinuous point determination circuit 65 includes a flip-flop 651 and a counter 652 like the first embodiment and performs the same operation as in the first embodiment. That is, the second discontinuous point determination circuit 65 generates a signal P2 corresponding to a negative discontinuous point of the wobble signal WB when two successive edges among the edges detected by the second edge detection circuit 63 exist in the predetermined time interval.

The ADIP signal generator 67 receives the signal P1 corresponding to the positive discontinuous point of the wobble signal WB and the signal P2 corresponding to the negative discontinuous point of the wobble signal WB, like the first embodiment, and generates an ADIP signal ADIP.

The ADIP signal detection method, which is performed by the ADIP signal detection circuit according to the second embodiment, is similar to the ADIP signal detection method performed by the ADIP signal detection circuit according to the first embodiment, and therefore the detailed descriptions thereof are omitted.

Figure 7:
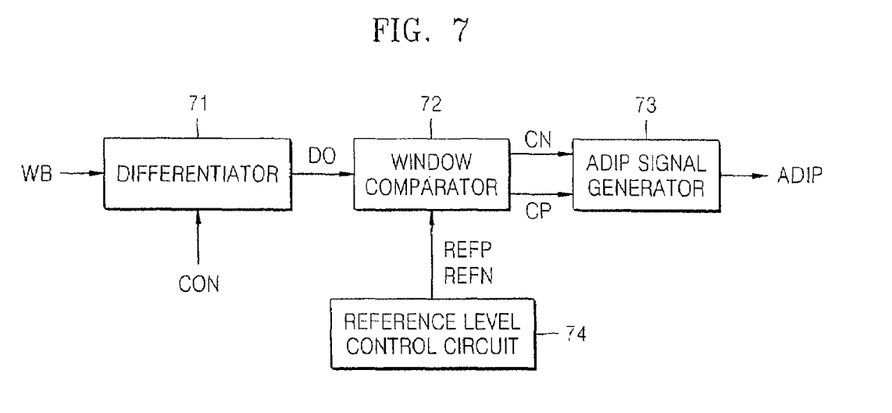
FIG. 7 is a block diagram of an ADIP signal detection circuit according to a third embodiment of the present invention.

FIG. 7 is a block diagram of an ADIP signal detection circuit according to a third embodiment of the present invention.

Referring to FIG. 7, the ADIP signal detection circuit according to the third embodiment of the present invention includes a differentiator 71, a window comparator 72, an ADIP signal generator 73, and a reference level control circuit 74.

The differentiator 71 receives a wobble signal WB input via the wobble detection circuit (not shown) and differentiates the received wobble signal WB in response to a control signal CON. Here, to obtain a correct signal, a low-pass filter (LPF) (not shown) can be connected to an output terminal of the differentiator 71, as necessary.

The window comparator 72 compares an output signal DO of the differentiator 71 with a positive reference level REFP and generates a first comparison signal CP. Also, the window comparator 72 compares an output signal of the differentiator 71 with a negative reference level REFN and generates a second comparison signal CN.

The ADIP signal generator 73 generates an ADIP signal ADIP, which represents a positive discontinuous point of the wobble signal WB in response to an edge of the first comparison signal CP and represents a negative discontinuous point of the wobble signal WB in response to an edge of the second comparison CN.

The signal ADIP is "low" (first logic state) at the rising edge of the first comparison signal CP and is "high" (second logic state) at the rising edge of the second comparison signal CN. Alternately, the signal ADIP is in the first logic state at the falling edge of the first comparison signal CP and is in the second logic state at the falling edge of the second comparison signal CN.

As a result, the ADIP signal generator 73 generates an ADIP signal ADIP with a first logic state when a discontinuous point exists in the positive data of the wobble signal WB, and generates an ADIP signal ADIP with a second logic state when a discontinuous point exists in the negative data of the wobble signal WB.

The reference level control circuit 74 controls the positive reference level REFP and the negative reference level REFN. The positive reference level REFP and the negative reference level REFN are closely related to the detection speed of the ADIP signal ADIP, and are related to correct detection of signals. Accordingly, to achieve a fast detection speed and prevent detection errors from be generated, it is necessary to determine an optimal level.

Figure 8:
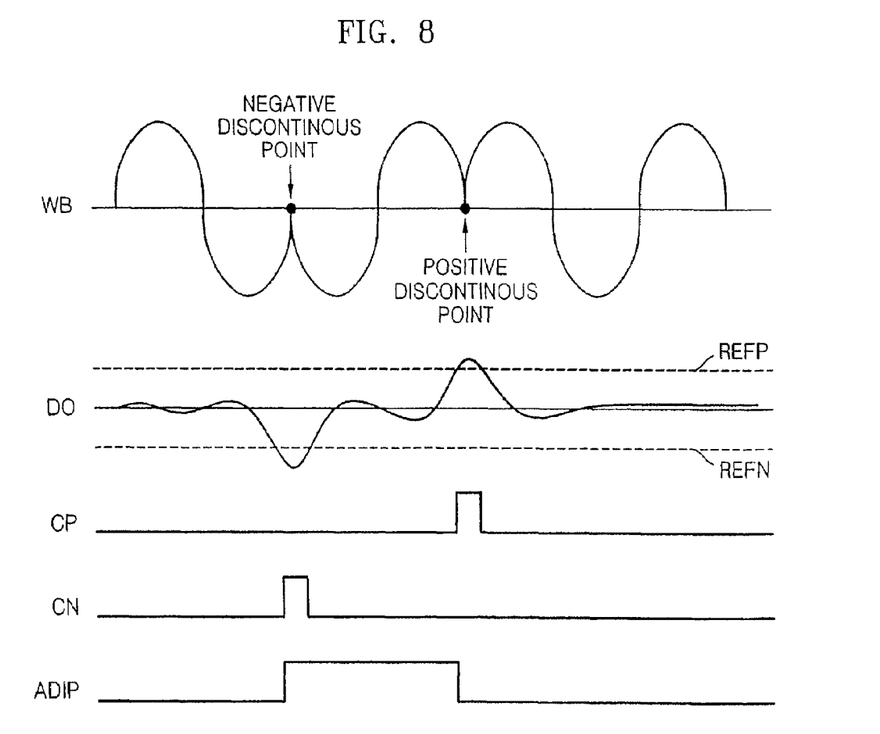
FIG. 8 shows waveforms of signals processed by the ADIP signal detection circuit of FIG. 7 when the ADIP signal detection circuit detects discontinuous points.

FIG. 8 shows waveforms of signals processed by the ADIP signal detection circuit of FIG. 7 when the ADIP signal detection circuit detects a discontinuous point.

Hereinafter, an ADIP signal detection method, which is performed by the ADIP signal detection circuit according to the third embodiment, will be described in more detail with reference to FIG. 8.

If a wobble signal WB is input via the wobble detection circuit (not shown), the wobble signal WB is differentiated through the differentiator 71. At this time, since the gradient of the wobble signal WB approaches infinity near a discontinuous point, an output signal DO of the differentiator 71 has a waveform as shown in FIG. 8.

Then, the output signal DO of the differentiator 71 is compared with a positive reference level REFP by the window comparator 72 and as a result a first comparison signal CP with a pulse format is generated. Also, the output signal DO of the differentiator 71 is compared with the negative reference level REFN by the window comparator 72 and as a result a second comparison signal CN with a pulse format is generated.

The first comparison signal CP and the second comparison signal CN are input to the ADIP signal generator 73. A final signal ADIP output from the ADIP signal generator 73 is "high" at the rising edges of the second comparison signal CN and is "low" at the rising edges of the first comparison signal CP.

In other words, the final signal ADIP is "high" when a negative discontinuous point exists in the wobble signal WB and is "low" when a positive discontinuous point exists in the wobble signal WB.

As described above, an ADIP signal detection circuit according to the present invention, which performs an ADIP signal detection method according to the present invention, comprises one or two window comparison circuits, two edge detection circuits each including an exclusive OR circuit and an AND circuit, and two discontinuous point determination circuits each including a flip-flop and a counter. Also, the ADIP signal detection circuit according to the present invention comprises a differentiator, a window comparator, and an ADIP signal generator that determines a discontinuous point. Therefore, the ADIP signal detection circuit has a simple configuration and has a fast operation speed, thereby allowing it to detect discontinuous points correctly and quickly.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An address in pre-groove (ADIP) signal detection circuit for a wobble detection system of an optical disc apparatus, the ADIP signal detection circuit comprising:
    a differentiator, which receives and differentiates a wobble signal;
    a window comparator, which compares an output signal of the differentiator with a positive reference level to generate a first comparison signal and compares the output signal of the differentiator with a negative reference level to generate a second comparison signal; and
    an ADIP signal generator, which generates an ADIP signal which represents a positive discontinuous point of the wobble signal in response to an edge of the first comparison signal and represents a negative discontinuous point of the wobble signal in response to an edge of the second comparison signal.

2. The ADIP signal detection circuit of claim 1, wherein the ADIP signal is in a first logic state at the edge of the first comparison signal and is in a second logic state at the edge of the second comparison signal.

3. The ADIP signal detection circuit of claim 2, wherein the edge of the first comparison signal and the edge of the second comparison signal are rising edges.

4. The ADIP signal detection circuit of claim 2, wherein the edge of the first comparison signal and the edge of the second comparison signal are falling edges.

5. The ADIP signal detection circuit of claim 1, further comprising a reference level control circuit which controls the positive reference level and the negative reference level.

6. An address in pre-groove (ADIP) signal detection method, which is performed by a wobble detection system of an optical disc apparatus, the ADIP signal detection method comprising:

receiving and differentiating a wobble signal;

comparing the differentiated signal with a positive reference level to generate a first comparison signal and comparing the differentiated signal with a negative reference signal to generate a second comparison signal; and generating an ADIP signal, which represents a positive discontinuous point of the wobble signal in response to an edge of the first comparison signal, and which represents a negative discontinuous point of the wobble signal in response to an edge of the second comparison signal.

7. The ADIP signal detection method of claim 6, wherein the ADIP signal is in a first logic state at the edge of the first comparison signal and is in a second logic state at the edge of the second comparison signal.

8. The ADIP signal detection method of claim 7, wherein the edge of the first comparison signal and the edge of the second comparison signal are rising edges.

9. The ADIP signal detection method of claim 7, wherein the edge of the first comparison signal and the edge of the second comparison signal are falling edges.

10. The ADIP signal detection method of claim 6, further comprising controlling the positive reference level and the negative reference level.

* * * * *